US012771062B2

(12) United States Patent
Kasar et al.

(10) Patent No.: US 12,771,062 B2
(45) Date of Patent: Oct. 20, 2026

(54) CONNECTOR ASSEMBLY

(71) Applicant: APPLE INC., Cupertino, CA (US)

(72) Inventors: Darshan R. Kasar, Redwood City, CA (US); Daniel C. Wagman, Scotts Valley, CA (US); Joshua A. Mendoza, Lancaster, CA (US); Christopher S. Graham, San Francisco, CA (US); James C. Wu, Menlo Park, CA (US); Varun K. Sanghvi, San Francisco, CA (US); Muhammad F. Hossain, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 450 days.

(21) Appl. No.: 18/377,967

(22) Filed: Oct. 9, 2023

(65) Prior Publication Data

US 2024/0162651 A1 May 16, 2024

Related U.S. Application Data

(60) Provisional application No. 63/425,588, filed on Nov. 15, 2022.

(51) Int. Cl.
*H01R 13/627* (2006.01)
*H01R 13/15* (2006.01)

(52) U.S. Cl.
CPC ......... *H01R 13/6275* (2013.01); *H01R 13/15* (2013.01)

(58) Field of Classification Search
CPC ............................ H01R 13/6275; H01R 13/15
USPC ........................................................ 439/352
See application file for complete search history.

(56) References Cited

U.S. PATENT DOCUMENTS 2,920,301 A * 1/1960 Kawate .................. H01R 33/20 439/168
4,481,458 A * 11/1984 Lane ...................... H02J 7/751 362/183
4,637,677 A * 1/1987 Barkus ..................... H01R 4/52 439/724
(Continued)

FOREIGN PATENT DOCUMENTS

CN 103877726 A 6/2014
CN 105807425 A 7/2016
(Continued)

*Primary Examiner* — Tulsidas C Patel
*Assistant Examiner* — Thomas K Quigley
(74) *Attorney, Agent, or Firm* — Young Basile Hanlon & MacFarlane, P.C.

(57) ABSTRACT

A receptacle connector includes a receptacle housing, pin contacts, and a retainer. The receptacle housing has a convex wall portion, a concave wall portion, a first side wall portion that extends between the convex wall portion and the concave wall portion, and a second side wall portion that extends between the convex wall portion and the concave wall portion. The convex wall portion, the concave wall portion, the first side wall portion, and the second side wall portion at least partially define a cavity having an open end. The pin contacts are located in the cavity of the receptacle housing. The retainer has a first side latch and a second side latch that are configured to extend into the cavity in an engaged position and to move outward from the cavity to a disengaged position.

24 Claims, 8 Drawing Sheets

(56) References Cited

U.S. PATENT DOCUMENTS

| | | | | |
|---|---|---|---|---|
| 4,993,958 | A * | 2/1991 | Trobough | H01R 12/79 439/91 |
| 5,104,331 | A * | 4/1992 | Goble | H01R 35/04 439/376 |
| 5,344,331 | A * | 9/1994 | Hoffman | H01R 13/641 439/138 |
| 5,395,248 | A * | 3/1995 | Kinoshita | H01R 35/04 439/31 |
| 5,408,059 | A * | 4/1995 | Goble | H01R 13/6392 200/51 R |
| 5,448,646 | A | 9/1995 | Lucey et al. | |
| 5,554,042 | A * | 9/1996 | Denninger | H01R 13/2414 439/272 |
| 5,627,727 | A * | 5/1997 | Aguilera | G06F 1/1626 361/725 |
| 5,716,228 | A * | 2/1998 | Chen | H01R 13/6275 439/358 |
| 5,860,826 | A * | 1/1999 | Chang | H01R 13/6275 439/358 |
| 5,893,772 | A * | 4/1999 | Carmo | H01R 13/639 439/348 |
| 5,915,987 | A | 6/1999 | Reed et al. | |
| 6,193,539 | B1 * | 2/2001 | Chang | H01R 13/6278 439/346 |
| 6,422,888 | B1 * | 7/2002 | Goble | H01R 13/62933 439/376 |
| 6,457,987 | B1 | 10/2002 | Yeh | |
| 6,953,361 | B2 | 10/2005 | Li et al. | |
| 7,086,889 | B2 * | 8/2006 | Yin | H01R 31/06 439/358 |
| 7,094,089 | B2 | 8/2006 | Andre et al. | |
| 7,232,349 | B1 * | 6/2007 | Chen | H01R 13/6392 439/810 |
| 7,311,526 | B2 | 12/2007 | Rohrbach et al. | |
| 7,351,066 | B2 | 4/2008 | DiFonzo et al. | |
| 7,517,222 | B2 | 4/2009 | Rohrbach et al. | |
| 7,740,499 | B1 | 6/2010 | Willey et al. | |
| 7,758,369 | B2 | 7/2010 | Miller et al. | |
| 7,798,831 | B2 | 9/2010 | Sanford et al. | |
| 7,811,114 | B2 | 10/2010 | Gabrielsson | |
| 7,942,678 | B2 | 5/2011 | Sanford et al. | |
| 8,311,255 | B2 | 11/2012 | Hankey et al. | |
| 8,401,219 | B2 | 3/2013 | Hankey et al. | |
| 8,439,697 | B2 * | 5/2013 | Vass | H01R 24/78 439/270 |
| 8,540,363 | B2 | 9/2013 | Abreu | |
| 8,545,013 | B2 | 10/2013 | Hwang et al. | |
| 8,867,758 | B2 | 10/2014 | Terlizzi et al. | |
| 8,882,524 | B2 | 11/2014 | Golko et al. | |
| 8,956,173 | B2 * | 2/2015 | Pomerantz | G06F 21/82 439/660 |
| 9,075,205 | B2 | 7/2015 | Pepe et al. | |
| 9,293,876 | B2 | 3/2016 | Terlizzi et al. | |
| 9,445,633 | B2 | 9/2016 | Tulloch et al. | |
| 9,472,897 | B2 * | 10/2016 | Kato | H01R 35/04 |
| 9,553,625 | B2 | 1/2017 | Hatanaka et al. | |
| 9,614,332 | B2 | 4/2017 | Curtin et al. | |
| 9,660,389 | B2 | 5/2017 | Gao et al. | |
| 9,768,538 | B1 | 9/2017 | Tulloch et al. | |
| 9,819,127 | B2 | 11/2017 | Condo et al. | |
| 9,822,554 | B2 | 11/2017 | Gresse | |
| 9,871,319 | B2 | 1/2018 | Golko et al. | |
| 9,877,549 | B2 | 1/2018 | Perkins et al. | |
| 9,912,081 | B2 | 3/2018 | Corona | |
| 9,927,618 | B2 | 3/2018 | Allin et al. | |
| 9,929,509 | B1 | 3/2018 | Penn et al. | |
| 10,058,149 | B1 | 8/2018 | Wittenberg et al. | |
| 10,122,117 | B2 | 11/2018 | Miller et al. | |
| 10,146,262 | B1 | 12/2018 | Magrath et al. | |
| 10,184,506 | B2 | 1/2019 | Chen et al. | |
| 10,264,857 | B2 | 4/2019 | Perkins et al. | |
| 10,326,235 | B2 | 6/2019 | Devoe | |
| 10,367,300 | B2 | 7/2019 | Shedletsky et al. | |
| 10,448,711 | B2 | 10/2019 | Kallman et al. | |
| 10,476,214 | B2 | 11/2019 | Golko et al. | |
| D874,459 | S | 2/2020 | Limaye et al. | |
| 10,560,775 | B2 | 2/2020 | Pham | |
| 10,575,602 | B2 | 3/2020 | Perkins et al. | |
| 10,594,159 | B2 | 3/2020 | Bossetti et al. | |
| 10,599,101 | B2 | 3/2020 | Rothkopf et al. | |
| 10,747,005 | B1 | 8/2020 | Sullivan | |
| 10,761,274 | B2 | 9/2020 | Pepe et al. | |
| 10,916,885 | B2 | 2/2021 | Yang et al. | |
| 11,026,484 | B2 | 6/2021 | Perkins et al. | |
| 11,320,659 | B1 | 5/2022 | Kasar et al. | |
| 11,670,893 | B2 * | 6/2023 | Horning | H01R 13/6275 439/346 |
| 11,695,231 | B2 * | 7/2023 | Johnson | H01R 13/4364 439/745 |
| 12,368,267 | B2 | 7/2025 | Hossain et al. | |
| 2004/0043644 | A1 * | 3/2004 | DiBene, II | G06F 1/18 439/74 |
| 2004/0101250 | A1 | 5/2004 | Vergeest | |
| 2005/0287860 | A1 * | 12/2005 | Yin | H01R 13/6395 439/358 |
| 2012/0071017 | A1 | 3/2012 | Gaul et al. | |
| 2012/0171884 | A1 | 7/2012 | Dang | |
| 2012/0188753 | A1 * | 7/2012 | Popper | H02J 7/731 362/183 |
| 2013/0063077 | A1 * | 3/2013 | Popper | H02J 7/751 320/107 |
| 2013/0210261 | A1 * | 8/2013 | Weber | H01R 13/627 439/358 |
| 2014/0056009 | A1 * | 2/2014 | Swedberg | H01R 33/0827 362/382 |
| 2014/0273546 | A1 * | 9/2014 | Harmon | H01R 13/6205 439/39 |
| 2015/0118879 | A1 * | 4/2015 | Swedberg | H01R 33/0827 439/226 |
| 2015/0236446 | A1 * | 8/2015 | Kashani | H01R 13/635 439/270 |
| 2015/0349457 | A1 | 12/2015 | Shariff et al. | |
| 2015/0364879 | A1 * | 12/2015 | Morley | H01R 24/40 439/578 |
| 2016/0216512 | A1 | 7/2016 | Miller et al. | |
| 2016/0378071 | A1 | 12/2016 | Rothkopf | |
| 2017/0094392 | A1 | 3/2017 | Zörkendörfer et al. | |
| 2017/0227793 | A1 | 8/2017 | Abreu | |
| 2018/0069361 | A1 * | 3/2018 | SooHoo | H01R 13/6658 |
| 2018/0295733 | A1 | 10/2018 | Wen et al. | |
| 2019/0220056 | A1 | 7/2019 | Yan | |
| 2019/0227328 | A1 | 7/2019 | Coatney | |
| 2020/0084533 | A1 | 3/2020 | Hankey et al. | |
| 2021/0304938 | A1 | 9/2021 | Kasar et al. | |
| 2023/0246382 | A1 * | 8/2023 | Henry | H01R 13/6273 439/352 |
| 2023/0305301 | A1 * | 9/2023 | Kasar | G02B 27/017 |
| 2024/0213712 | A1 * | 6/2024 | Yao | H01R 13/2492 |
| 2024/0213724 | A1 | 6/2024 | Mendoza et al. | |

FOREIGN PATENT DOCUMENTS

| | | | |
|---|---|---|---|
| CN | 205750111 | U | 11/2016 |
| CN | 206224049 | U | 6/2017 |
| CN | 207440422 | U | 6/2018 |
| CN | 104793338 | B | 8/2018 |
| CN | 105892065 | B | 8/2018 |
| CN | 105476187 | B | 9/2018 |
| CN | 105376970 | B | 1/2019 |
| CN | 105661735 | B | 6/2019 |
| EP | 2362498 | A2 | 8/2011 |
| EP | 3682756 | A1 | 7/2020 |
| WO | 2017113487 | A1 | 7/2017 |
| WO | 2020038004 | A1 | 2/2020 |

* cited by examiner

CONNECTOR ASSEMBLY

CROSS-REFERENCE TO RELATED APPLICATIONS

This application claims the benefit of, and priority to, U.S. Provisional Application No. 63/425,588, filed on Nov. 15, 2022, the contents of which are hereby incorporated in their entirety herein for all purposes.

FIELD

The present disclosure relates generally to the field of connector assemblies for physical and electrical connection of devices.

BACKGROUND

Devices often include connectors that allow physical and/or electrical attachment to an accessory, power source, data interface, or other device. Such connectors may be configured to resist physical and/or electrical disconnection.

SUMMARY

A first aspect of the disclosure is a receptacle connector that includes a receptacle housing, pin contacts, and a retainer. The receptacle housing has a convex wall portion, a concave wall portion, a first side wall portion that extends between the convex wall portion and the concave wall portion, and a second side wall portion that extends between the convex wall portion and the concave wall portion. The convex wall portion, the concave wall portion, the first side wall portion, and the second side wall portion at least partially define a cavity having an open end. The pin contacts are located in the cavity of the receptacle housing. The retainer has a first side latch and a second side latch that are configured to extend into the cavity in an engaged position and to move outward from the cavity to a disengaged position.

The first side latch may be configured to extend into the cavity through a first latch opening in the first side wall portion of the receptacle housing in the engaged position, and the second side latch may be configured to extend through a second latch opening in the second side wall portion of the receptacle housing in the engaged position. The retainer may include a spring that urges the first side latch and the second side latch toward the engaged position. The first side latch and the second side latch may be configured for engagement with a corresponding plug connector to retain the corresponding plug connector in the cavity of the receptacle housing.

The retainer may include a release that is operable to cause movement of the first side latch and the second side latch of the retainer between the engaged position and the disengaged position. The retainer may have a push block that is in engagement with the first side latch and the second side latch, and movement of the push block with respect to the first side latch and the second side latch causes movement of the first side latch and the second side latch between the engaged position and the disengaged position. The push block may have a first contact surface that is in engagement with the first side latch and a second contact surface that is in engagement with the second side latch, and the first contact surface and the second contact surface may be angled relative to a movement axis of the push block.

A second aspect of the disclosure is a receptacle connector that includes a receptacle housing, pin contacts, and a retainer. The receptacle housing may have a first curved wall portion, a second curved wall portion, a first side wall portion, and a second side wall portion that at least partially define a cavity having an open end. The first curved wall portion and the second curved wall portion are spaced in a height direction of the receptacle housing, and the first side wall portion and the second side wall portion are spaced in a width direction of the receptacle housing. The pin contacts are located along the first curved wall portion of the receptacle housing and spaced from each other in the width direction of the receptacle housing. The retainer has a first side latch, a second side latch, and a release. The first side latch is configured to extend into the cavity through a first latch opening in the first side wall portion of the receptacle housing in an engaged position of the retainer and to move outward from the cavity to a disengaged position of the retainer. The second side latch is configured to extend through a second latch opening in the second side wall portion of the receptacle housing in the engaged position of the retainer and to move outward from the cavity to the disengaged position of the retainer. The release is operable to cause movement of the retainer between the engaged position and the disengaged position.

The pin contacts may each be oriented according to a curvature of the first curved wall portion. Each of the pin contacts may be configured to deflect along a respective line of action that is normal to a curvature of the first curved wall portion at each of the pin contacts.

In some implementations, the pin contacts include a first group of two or more contacts at a first angular orientation relative to the receptacle housing, a second group of two or more contacts at a second angular orientation relative to the receptacle housing, and a third group of two or more contacts at a third angular orientation relative to the receptacle housing, wherein the first angular orientation, the second angular orientation, and the third angular orientation are different from each other. The first group of two or more contacts may be located between the second group of two or more contacts and the third group of two or more contacts, the second group of two or more contacts may be oriented outward relative to the first group of two or more contacts, and the third group of two or more contacts may be oriented outward relative to the first group of two or more contacts.

In some implementations, the first curved wall portion has a convex curvature relative to the cavity and the second curved wall portion has a concave curvature relative to the cavity. In some implementations, the first curved wall portion has a concave curvature relative to the cavity and the second curved wall portion has a convex curvature relative to the cavity.

In some implementations, the pin contacts are first pin contacts, the receptacle connector further includes second pin contacts located along the second curved wall portion of the receptacle housing and spaced from each other in the width direction of the receptacle housing. In some implementations, the receptacle housing has an end wall portion that at least partially defines the cavity and is spaced from the open end of the cavity in a depth direction of the receptacle housing.

A third aspect of the disclosure is a receptacle connector that includes a receptacle housing, first pin contacts, and second pin contacts. The receptacle housing has a convex wall portion and a concave wall portion that at least partially define a cavity having an open end. The first pin contacts are spaced along the convex wall portion of the receptacle housing and are each configured to deflect along a respective line of action that is normal to a convex curvature of the convex wall portion at each of the first pin contacts. The second pin contacts are spaced along the concave wall portion of the receptacle housing and are each configured to deflect along a respective line of action that is normal to a concave curvature of the concave wall portion at each of the second pin contacts.

The first pin contacts may be spaced from each other in a width direction of the receptacle housing and the second pin contacts may be spaced from each other in the width direction of the receptacle housing.

In some implementations, the receptacle connector includes a retainer having a first side latch and a second side latch configured to extend into the cavity in an engaged position and to move outward from the cavity to a disengaged position, wherein the first side latch and the second side latch are configured for engagement with a corresponding plug connector to retain the corresponding plug connector in the cavity of the receptacle housing. In some implementations, the retainer has a push block that has a first contact surface that is in engagement with the first side latch and a second contact surface that is in engagement with the second side latch, the first contact surface and the second contact surface are angled relative to a movement axis of the push block, and movement of the push block with respect to the first side latch and the second side latch causes movement of the first side latch and the second side latch between the engaged position and the disengaged position.

A fourth aspect of the disclosure is a plug connector that includes a connector body, first contact pads, and second contact pads. The connector body has a convex wall portion and a concave wall portion. The first contact pads are spaced along the convex wall portion of the connector body. The second contact pads are spaced along the concave wall portion of the connector body.

The first contact pads may be spaced from each other in a width direction of the connector body, and the second contact pads may be spaced from each other in the with direction of the connector body. In some implementations, the connector body defines a first side wall portion that extends from the convex wall portion to the concave wall portion and a second side wall portion that extends from the convex wall portion to the concave wall portion. In some implementations of the plug connector, the first side wall portion of the connector body defines a first retainer notch that extends from the convex wall portion to the concave wall portion, and the second side wall portion of the connector body defines a second retainer notch that extends from convex wall portion to the concave wall portion.

A fifth aspect of the disclosure is a headband that includes a first plug connector, a second plug connector, and an intermediate portion. The first plug connector has a first convex wall portion, a first concave wall portion, and first connector pads that are located on at least one of the first convex wall portion or the first concave wall portion. The second plug connector has a second convex wall portion, a second concave wall portion, and second connector pads that are located on at least one of the second convex wall portion or the second concave wall portion. The intermediate portion extends between the first plug connector and the second plug connector.

In some implementations of the headband, the intermediate portion is rigid. In some implementations of the headband, the intermediate portion is flexible.

DETAILED DESCRIPTION

The disclosure herein relates to connector assemblies that include a plug connector and a receptacle connector that can be moved between connected and disconnected positions with respect to each other. The plug connector and/or the receptacle connector may be incorporated in devices to allow physical and electrical connection to other structures. As one example, the connector assemblies described herein may facilitate connection of a device to an accessory, such as an audio accessory, a sensor module, a battery pack, or other type of accessory. In some implementations, the device is a wearable device, and the accessory is a support that allows the wearable device to be worn by a user, such as a waist band, a wrist band, or a head band.

The plug connectors and receptacle connectors that are described herein include curved surfaces, which may be incorporated in the plug connectors and/or the receptacle connectors for aesthetic reasons, ergonomic reasons, packaging reasons, or other reasons. The plug connectors and receptacle connectors described herein may include features, such as configurations of electrical contacts and retainers, that facilitate secure connection of the plug connectors relative to the receptacle connectors and resist inadvertent disconnector, such as an inadvertent electrical disconnection as a result of disengagement of electrical contacts of the plug connector relative to electrical contacts of the receptacle connector.

Figure 1A:
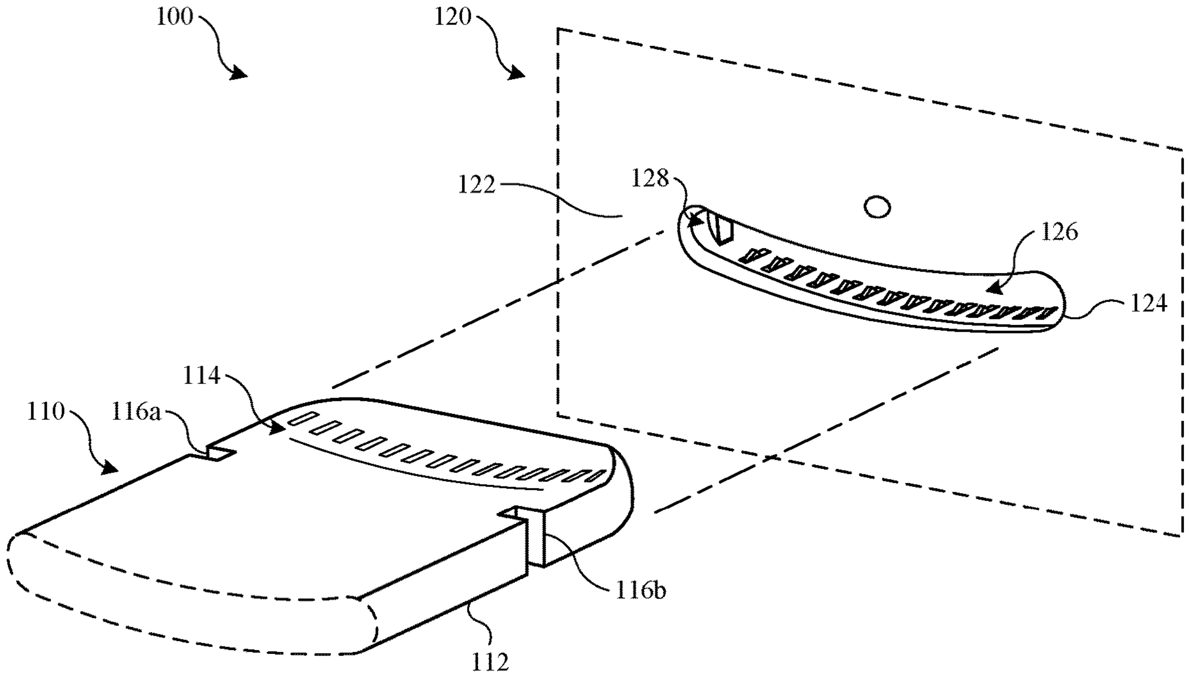
FIGS. 1A-1B are perspective views of a connector assembly in a disconnected position and a connected position.
Figure 1B:
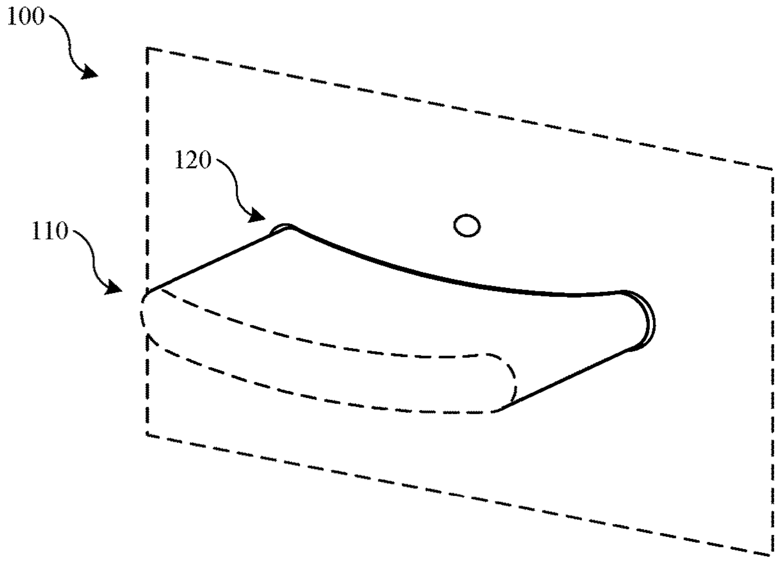

FIGS. 1A-1B show a connector assembly 100. The connector assembly 100 includes a plug connector 110 having a connector body 112 and contact pads 114. Retainer notches are defined on the connector body 112 of the plug connector 110, such as a first retainer notch 116*a* and a second retainer notch 116*b* in the illustrated implementation. The connector assembly 100 also includes a receptacle connector 120 having a receptacle housing 122 that defines a cavity 124, pin contacts 126, and a retainer 128. The plug connector 110 and the receptacle connector 120 are complementary to each other, and are configured to be connected to each other. The plug connector 110 and the receptacle connector 120 may be referred to as connector portions, such as first and second connector portions.

The connector assembly 100 is movable between a disconnected position (FIG. 1A) and a connected position (FIG. 1B). In the disconnected position, the plug connector 110 is spaced from the receptacle connector 120. In the connected position, at least part of the connector body 112 of the plug connector 110 is disposed in the cavity 124 of the receptacle connector 120. In the connected position, the contact pads 114 of the plug connector 110 may be in contact with the pin contacts 126 of the receptacle connector 120 to establish an electrical connection between the plug connector 110 and the receptacle connector 120. In the connected position, the first retainer notch 116*a* and the second retainer notch 116*b* of the plug connector 110 may be engaged with the retainer 128 of the receptacle connector 120 to resist removal of the plug connector 110 from the cavity 124 of the receptacle connector 120, and thereby resist movement of the connector assembly 100 from the connected position to the disconnected position. To move the connector assembly 100 from the connected position to the disconnected position, the retainer 128 may be disengaged from the plug connector 110 prior to withdrawal of the plug connector 110 from the cavity 124. As an example the retainer 128 may be disengaged using a tool, as a will be explained herein.

Figure 2:
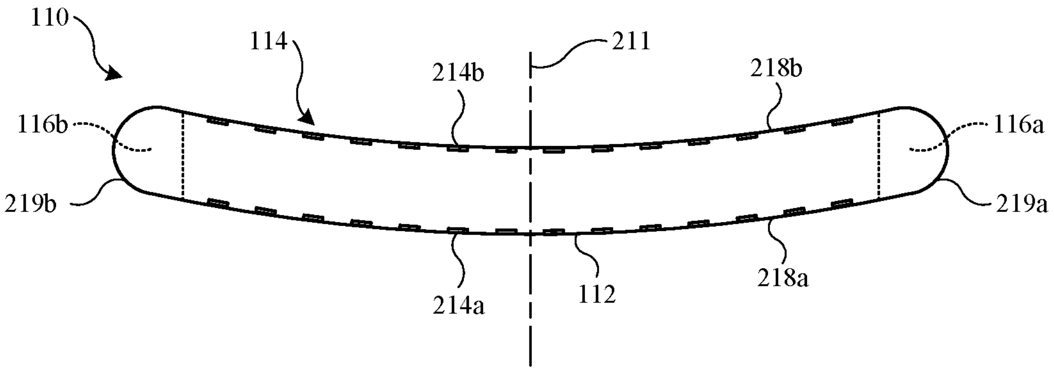
FIG. 2 is a front view of a plug connector of the connector assembly.

FIG. 2 is a front view of the plug connector 110 of the connector assembly 100. The connector body 112 of the plug connector 110 is a primary structure of the plug connector 110. The connector body 112 defines geometric features that are complementary to geometric features of the cavity 124 of the receptacle connector 120 to allow engagement of the plug connector 110 with the receptacle connector 120 and thereby establish a structural connector of the plug connector 110 with respect to the receptacle connector 120. The connector body 112 also functions to support the contact pads 114 to facilitate electrical connection of the plug connector 110 with respect to the receptacle connector 120. To facilitate secure structural and electrical connections between the plug connector 110 and the receptacle connector 120, all of or part of the connector body 112 may be substantially rigid.

The connector body 112 defines first and second curved wall portions, such as a convex wall portion 218*a* and a concave wall portion 218*b*. The convex wall portion 218*a* and the concave wall portion 218*b* are spaced from one another in the height direction of the plug connector 110. A thickness of the connector body 112 between the convex wall portion 218*a* and the concave wall portion 218*b* may be generally constant. As an example the convex wall portion 218*a* and the concave wall portion 218*b* may be constructed according to curves having a common center point (e.g., located outward from the concave wall portion 218*b*) and differing radii (e.g., where the difference is equal to the thickness of the connector body 112 between the convex wall portion 218*a* and the concave wall portion 218*b*). Thus, the convex wall portion 218*a* may be constructed according to a first radius and the concave wall portion 218*b* may be constructed according to a second radius, where the first radius is greater than the second radius. Other geometric configurations may be utilized to define the convex wall portion 218*a* and the concave wall portion 218*b*.

The connector body 112 defines a first side wall portion 219*a* and a second side wall portion 219*b*. The first side wall portion 219*a* is located on a first side of a center line 211 of the connector body 112, and extends from the convex wall portion 218*a* to the concave wall portion 218*b*. The second side wall portion 219*b* is located on a second side of the center line 211 and extends from the convex wall portion 218*a* to the concave wall portion 218*b*. The first side wall portion 219*a* and the second side wall portion 219*b* of the connector body 112 may each have a curved configuration that extends from the convex wall portion 218*a* to the concave wall portion 218*b*, or may have another configuration.

The connector body 112 of the connector assembly 100 is generally symmetrical in a width direction of the connector body 112 relative to a center line 211. The center line 211 extends in a height direction of the connector body 112. The connector body 112 may incorporate features that deviate from a symmetrical configuration, such as features that are intended to prevent connection of the plug connector 110 in an incorrect orientation or to prevent connection to an incorrect receptacle connector (e.g., poka yoke features complementary to features of the receptacle connector 120).

The contact pads 114 are electrically conductive structures that are configured to engage complementary features of the receptacle connector 120. The contact pads 114 are electrically connected (e.g., by wires) to an electrical component that is associated with the plug connector 110, such as a circuit, an input device, and output device, a sensor, a power source, or another connector. The contact pads 114 include first contact pads 214*a* that are located on the convex wall portion 218*a* and second contact pads 214*b* that are located on the concave wall portion 218*b*. The first contact pads 214*a* are spaced relative to one another along the convex wall portion 218*a* of the connector body 112. The second contact pads 214*b* are spaced along the concave wall portion 218*b* of the connector body 112. Thus, the first contact pads 214*a* may be spaced from each other in the width direction of the connector body 112, and the second contact pads 214*b* may be spaced from each other in the with direction of the connector body 112.

The first side wall portion 219*a* of the connector body 112 defines the first retainer notch 116*a* such that it extends from the convex wall portion 218*a* to the concave wall portion 218*b*. The first retainer notch 116*a* is an opening that extends in a length direction of the connector body 112 while extending inward from the first side wall portion 219*a* toward the center line 211, thereby deviating from the nominal profile of the connector body 112 to allow engagement with the retainer 128 of the receptacle connector 120. The second side wall portion 219*b* of the connector body 112 defines the second retainer notch 116*b* such that it extends from the convex wall portion 218*a* to the concave wall portion 218*b*. The second retainer notch 116*b* is an opening that extends in a length direction of the connector body 112 while extending inward from the second side wall portion 219*b* toward the center line 211, thereby deviating from the nominal profile of the connector body 112 to allow engagement with the retainer 128 of the receptacle connector 120.

Figure 3A:
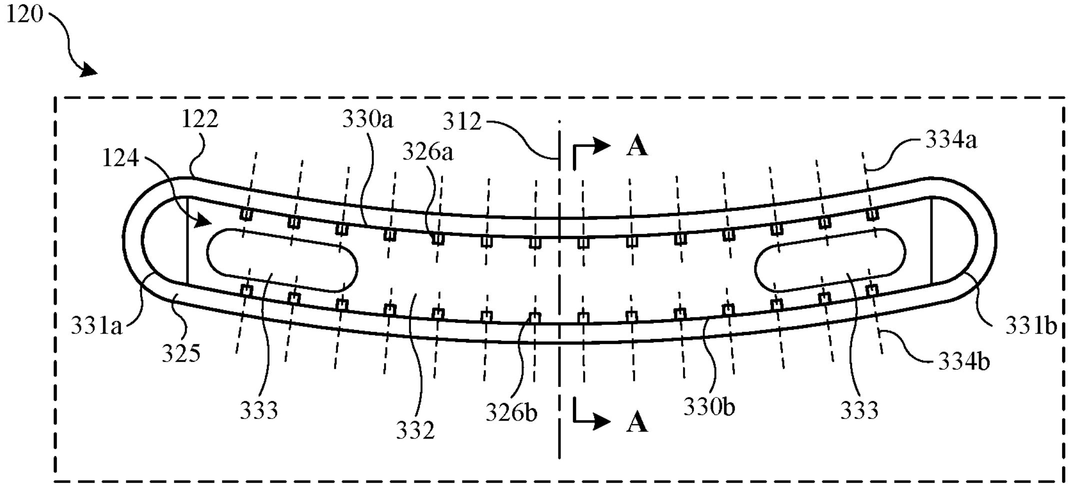
FIG. 3A is a front view of a receptacle connector of the connector assembly.

FIG. 3A is a front view of a receptacle connector 120 of the connector assembly 100. The receptacle housing 122 of the receptacle connector 120 is a primary structural member of the receptacle connector 120. The cavity 124 is defined by the receptacle housing 122, the pin contacts 126 are connected to the receptacle housing 122, and the retainer 128 is connected to the receptacle housing 122.

The receptacle housing 122 has curved wall portions (e.g., first and second curved wall portions) that are spaced in a height direction of the receptacle housing 122, such as a convex wall portion 330*a* and a concave wall portion 330*b*. The geometric configurations of the convex wall portion 330*a* and the concave wall portion 330*b* are complementary to the geometric configurations of the convex wall portion 218*a* and the concave wall portion 218*b* of the connector body 112, and therefore can be configured in the same way as previously described.

The receptacle housing 122 also has a first side wall portion 331*a* that extends between the convex wall portion 330*a* and the concave wall portion 330*b*, and a second side wall portion 331*b* that extends between the convex wall portion 330*a* and the concave wall portion 330*b*. The first side wall portion 331*a* and the second side wall portion 331*b* are located on opposite sides of a center line 321 of the receptacle housing 122 that extends in the height direction of the receptacle housing 122. Thus, the first side wall portion 331*a* and the second side wall portion 331*b* may be spaced in a width direction of the receptacle housing 122 (e.g., the width direction being transverse to the center line 321). The receptacle housing 122 and the cavity 124 may be generally symmetrical with respect to the center line 321.

The receptacle housing 122 also has an end wall portion 332 that extends transverse to a depth direction (e.g., an insertion direction) of the receptacle housing 122 and is bordered at its outer periphery by the convex wall portion 330*a*, the concave wall portion 330*b*, the first side wall portion 331*a*, and the second side wall portion 331*b*. The convex wall portion 330*a*, the concave wall portion 330*b*, the first side wall portion 331*a*, the second side wall portion 331*b*, and the end wall portion 332 at least partially define the cavity 124, which has an open end opposite the end wall portion 332 in the depth direction of the receptacle housing 122. Compliant bumpers 333 may be formed on the end wall portion 332 to bias the plug connector 110 outward relative to the receptacle connector 120 to enhance engagement of the retainer 128 with the plug connector 110 and to facilitate removal of the plug connector 110 from the receptacle connector 120 when the retainer 128 is disengaged.

The convex wall portion 330*a*, the concave wall portion 330*b*, the first side wall portion 331*a*, and the second side wall portion 331*b* extend around the perimeter of the open end of the cavity 124. A seal 325 may be connected to the receptacle housing 122 and extend around the open end of the cavity 124. The seal 325 is a compliant structure (e.g., a rubber seal or a silicone seal) that is configured to engage the plug connector 110 when the plug connector 110 is located in the cavity 124 of the receptacle connector 120 in the connected position of the connector assembly 100. As an example, the seal 325 may resist entry of water and debris into the cavity 124 when the connector assembly 100 is in the connected position.

The pin contacts 126 are located in the cavity 124 of the receptacle housing 122, and include first pin contacts 326*a* and second pin contacts 326*b*. In the illustrated implementation, the pin contacts 126 are spring pin contacts that are configured to deflect in response to engagement with an external structure, such as the contact pads 114 of the plug connector 110. Alternatively, the pin contacts 126 may be configured as pogo pin contacts or according to other configurations.

The first pin contacts 326*a* are located along the convex wall portion 330*a* of the receptacle housing 122 and are spaced from each other in the width direction of the receptacle housing 122. In the illustrated implementation, the first pin contacts 326*a* are each oriented according to the convex curvature of the convex wall portion 330*a*. Accordingly, each of the first pin contacts 326*a* is configured to deflect along a respective line of action 334*a* that is normal to a curvature of the convex wall portion 330*a* at each of the first pin contacts 326*a*. The respective lines of action 334*a* for the first pin contacts 326*a* are different from each other in correspondence to the changing angular orientation of the convex wall portion 330*a* (e.g., relative to the angular orientation of the convex wall portion 330*a* at the center line 321) in the width direction of the receptacle housing 122. Thus, the respective lines of action 334*a* of the first pin contacts 326*a* extend outward from the center line 321 at progressively larger angles as the distance between the respective one of the first pin contacts 326*a* and the center line 321 increases.

The second pin contacts 326*b* are located along the concave wall portion 330*b* of the receptacle housing 122 and are spaced from each other in the width direction of the receptacle housing 122. In the illustrated implementation, the second pin contacts 326*b* are each oriented according to the concave curvature of the concave wall portion 330*b*. Accordingly, each of the second pin contacts 326*b* is configured to deflect along a respective line of action 334*b* that is normal to a curvature of the concave wall portion 330*b* at each of the second pin contacts 326*b*. The respective lines of action 334*b* for the second pin contacts 326*b* are different from each other in correspondence to the changing angular orientation of the concave wall portion 330*b* (e.g., relative to the angular orientation of the concave wall portion 330*b* at the center line 321) in the width direction of the receptacle housing 122. Thus, the respective lines of action 334*b* of the second pin contacts 326*b* extend inward toward from the center line 321 at progressively larger angles as the distance between the respective one of the second pin contacts 326*b* and the center line 321 increases.

Figure 3B:
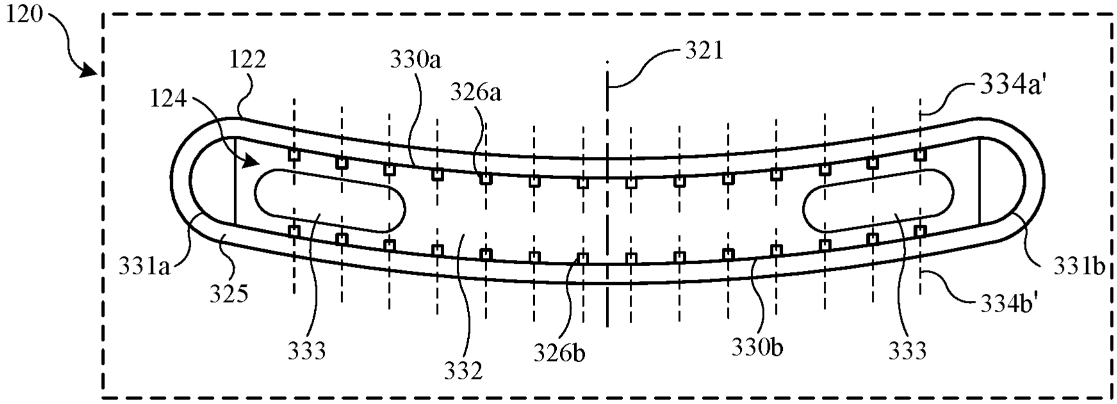
FIG. 3B is a front view of a receptacle connector according to an alternative implementation.

FIG. 3B is a front view of the receptacle connector 120 according to an alternative implementation in which the pin contacts 126 are not oriented according to the curvature of the convex wall portion 330*a* and the concave wall portion 330*b*. Instead, the first pin contacts 326*a* are each oriented similarly to one another, such as by each extending along a respective line of action 334*a*' that is parallel to the center line 321. Similarly, the second pin contacts 326*b* are each oriented similarly to one another, such as by each extending along a respective line of action 334*b*' that is parallel to the center line 321. The implementation shown in FIG. 3B benefits from decreased manufacturing complexity as compared to the implementation shown in FIG. 3A but may be less tolerant with regard to maintaining electrical contact between the plug connector 110 and the receptacle connector 120 during application of force and/or relative motion between the plug connector 110 and the receptacle connector 120.

Figure 3C:
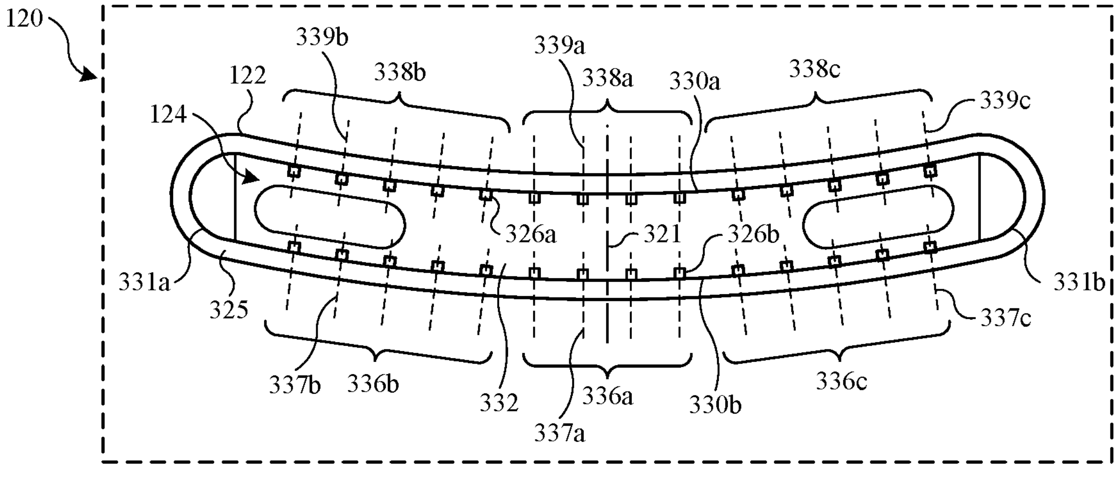
FIG. 3C is a front view of a receptacle connector according to an alternative implementation.

FIG. 3C is a front view of the receptacle connector 120 according to an alternative implementation in which the pin contacts 126 are not oriented according to the curvature of the convex wall portion 330*a* and the concave wall portion 330*b*. Instead, the pin contacts 126 are divided into groups of two or more pin contacts, where each group shares a common angular orientation, but the angular orientations of the groups are different from each other.

In the illustrated implementation, the first pin contacts 326*a*, which are located on the convex wall portion 330*a*, include a first group 336*a* of two or more contacts (e.g., two or more of the first pin contacts 326*a*), a second group 336*b* of two or more contacts (e.g., two or more of the first pin contacts 326*a*), and a third group 336*c* of two or more contacts (e.g., two or more of the first pin contacts 326*a*). The pin contacts from the first group 336*a* of the first pin contacts 326*a* extend at a first angular orientation relative to the receptacle housing 122, and are configured to deflect along respective lines of action 337*a*. The pin contacts from the second group 336*b* of the first pin contacts 326*a* extend at a second angular orientation relative to the receptacle housing 122, and are configured to deflect along respective lines of action 337*b*. The pin contacts from the third group

336*c* of the first pin contacts 326*a* extend at a third angular orientation relative to the receptacle housing 122, and are configured to deflect along respective lines of action 337*c*. The first angular orientation of the first group 336*a*, the second angular orientation of the second group 336*b*, and the third angular orientation of the third group 336*c* are different from each other. The first group 336*a* of the first pin contacts 326*a* is located between the second group 336*b* and the third group 336*c*. As an example, the first group 336*a* may be centered on the center line 321 of the receptacle housing 122. The second group 336*b* of the first pin contacts 326*a* may be oriented outward relative to the first group 336*a* of the first pin contacts 326*a*, and the third group 336*c* of the first pin contacts 326*a* may be oriented outward relative to the first group 336*a* of the first pin contacts 326*a*. The second group 336*b* of the first pin contacts 326*a* and the third group 336*c* of the first pin contacts 326*a* are located on opposite sides of the center line 321 of the receptacle housing 122.

Similarly, the second pin contacts 326*b*, which are located on the concave wall portion 330*b*, include a first group 338*a* of two or more contacts (e.g., two or more of the second pin contacts 326*b*), a second group 338*b* of two or more contacts (e.g., two or more of the second pin contacts 326*b*), and a third group 338*c* of two or more contacts (e.g., two or more of the second pin contacts 326*b*). The pin contacts from the first group 338*a* of the second pin contacts 326*b* extend at a first angular orientation relative to the receptacle housing 122, and are configured to deflect along respective lines of action 339*a*. The pin contacts from the second group 338*b* of the second pin contacts 326*b* extend at a second angular orientation relative to the receptacle housing 122, and are configured to deflect along respective lines of action 339*b*. The pin contacts from the third group 338*c* of the second pin contacts 326*b* extend at a third angular orientation relative to the receptacle housing 122, and are configured to deflect along respective lines of action 339*c*. The first angular orientation of the first group 338*a*, the second angular orientation of the second group 338*b*, and the third angular orientation of the third group 338*c* are different from each other. The first group 338*a* of the second pin contacts 326*b* is located between the second group 338*b* and the third group 338*c*. As an example, the first group 338*a* may be centered on the center line 321 of the receptacle housing 122. The second group 338*b* of the second pin contacts 326*b* may be oriented inward relative to the first group 338*a* of the second pin contacts 326*b*, and the third group 338*c* of the second pin contacts 326*b* may be oriented inward relative to the first group 338*a* of the second pin contacts 326*b*. The second group 338*b* of the second pin contacts 326*b* and the third group 338*c* of the second pin contacts 326*b* are located on opposite sides of the center line 321 of the receptacle housing 122.

It should be understood that variations of the implementations of the pin contacts 126 shown in FIGS. 3A-3C may be used. As one example, these implementations may be applied in the context of receptacle housings having a first curved wall portion and a second curved wall portion, where the first curved wall portion is either of the convex wall portion 330*a* or the concave wall portion 330*b* and the second curved wall portion is the other of the convex wall portion 330*a* or the concave wall portion 330*b*. In addition, implementations are contemplated in which the pin contacts 126 are located only on one of the convex wall portion 330*a* or the concave wall portion 330*b* and the other pin contacts are omitted. Thus, the pin contacts 126 may be located only on the convex wall portion 330*a*, only on the concave wall portion 330*b*, or on both of the convex wall portion 330*a* and the convex wall portion 330*a*. Stated more generally, the pin contacts 126 may be located only on a first curved wall portion of the receptacle housing 122, only on a second curved wall portion of the receptacle housing 122, or on both of a first curved wall portion and a second curved wall portion of the receptacle housing 122.

Figure 4A:
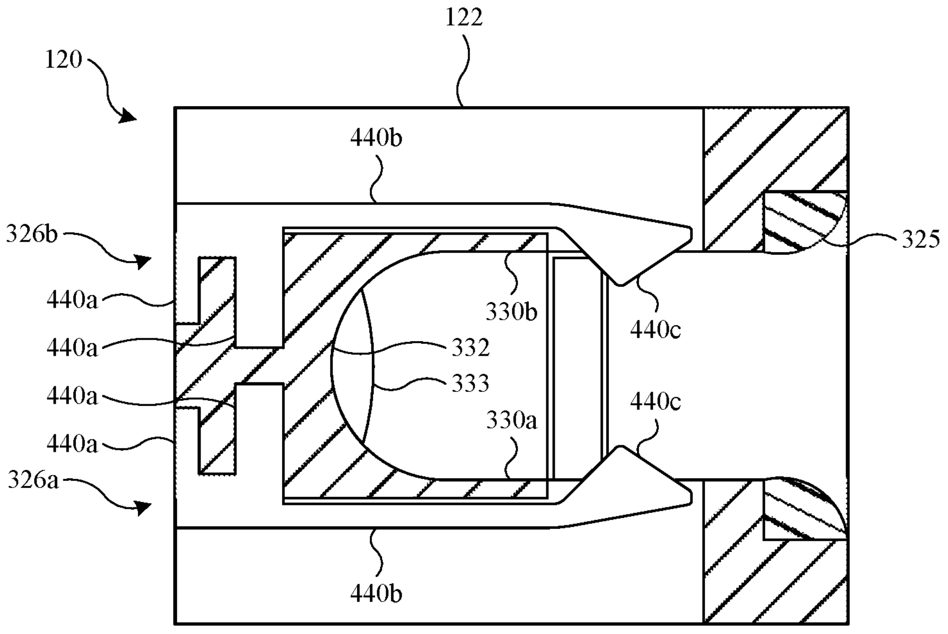
FIG. 4A is a cross-section view of the receptacle connector taken on line A of FIG. 3A.
Figure 4B:
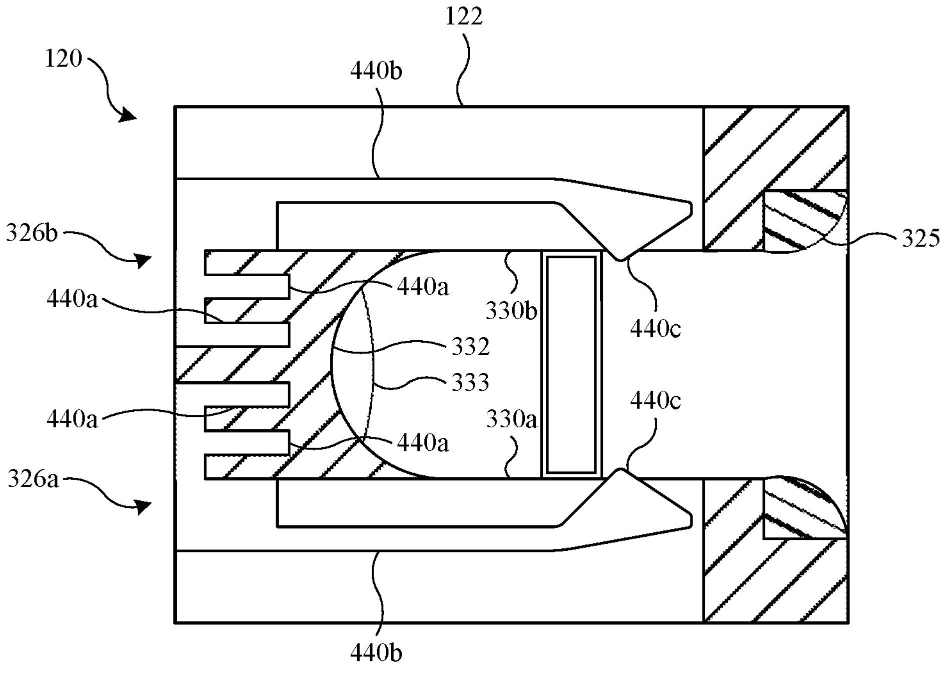
FIG. 4B is a cross-section view of the receptacle connector according to an alternative implementation taken on line A of FIG. 3A.

FIG. 4A is a cross-section view of the receptacle connector 120 taken along line A of FIG. 3A showing the pin contacts 126, including one of the first pin contacts 326*a* and one of the second pin contacts 326*b*. Each of the first pin contacts 326*a* and the second pin contacts 326*b* includes coupler portions 440*a* that secure the respective one of the first pin contacts 326*a* or the second pin contacts 326*b* to the receptacle housing 122 (e.g., the coupler portion 440*a* is embedded in the receptacle housing 122), a leg portion 440*b* that extends outward from the coupler portions 440*a* in the depth direction of the receptacle housing 122 to allow deflection, and a tip portion 440*c* that is located at an end of the leg portion 440*b* and is configured for engagement with a respective one of the contact pads 114 of plug connector 110. In the embodiment shown in FIG. 4A, the coupler portions 440*a* extend in the depth direction of the receptacle housing 122, and are manufactured by insertion of the pin contacts 126 relative to the receptacle housing 122 in the depth direction of the receptacle housing 122, by an axial pin stitching operation. The embodiment shown in FIG. 4B is similar to the embodiment of FIG. 4A, except that the coupler portions 440*a* extend in the height direction of the receptacle housing 122, and are manufactured by insertion of the pin contacts 126 relative to the receptacle housing 122 in the height direction of the receptacle housing 122, by a vertical pin stitching operation.

Figure 5A:
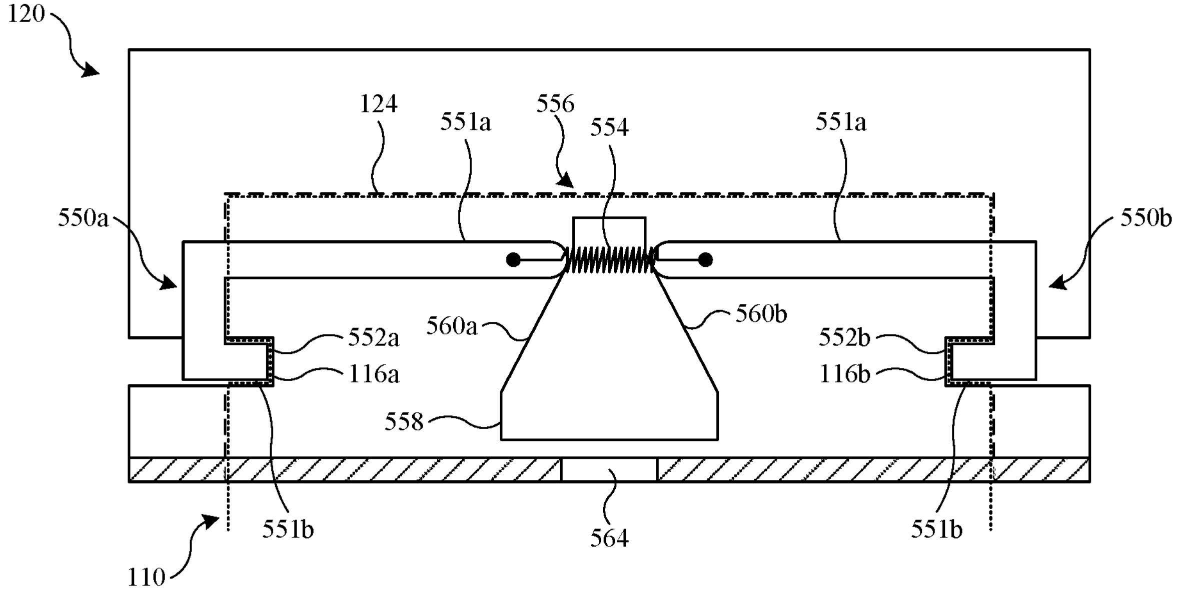
FIGS. 5A-5B are top views of the receptacle connector of FIG. 3A showing a retainer.
Figure 5B:
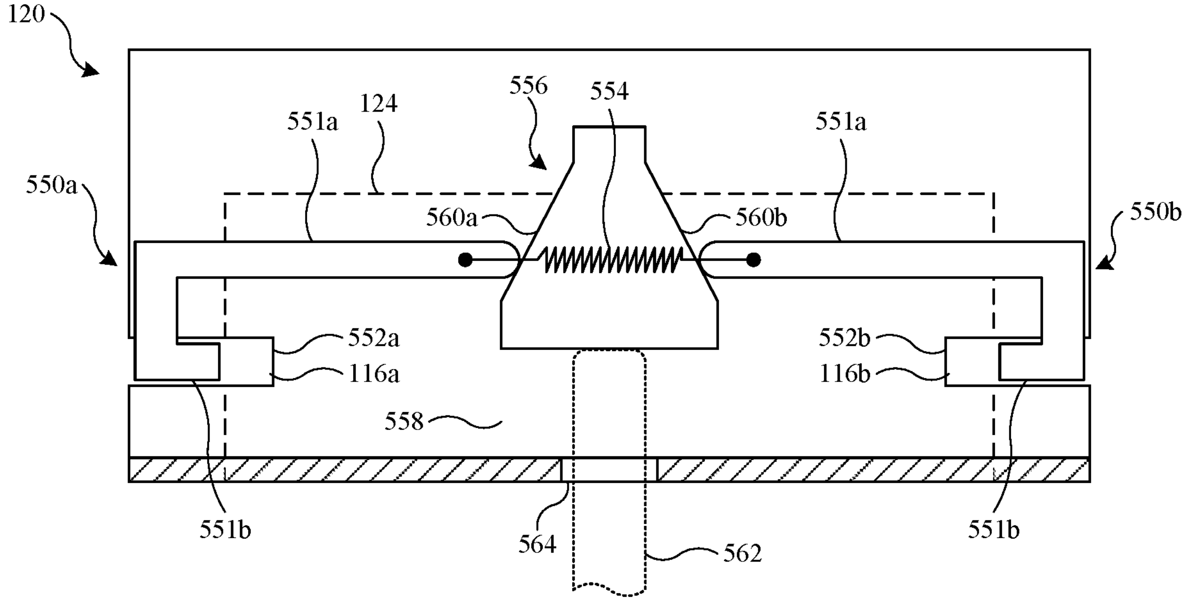

FIGS. 5A-5B are top views of the receptacle connector 120 showing the retainer 128. The retainer 128 has a first side latch 550*a* and a second side latch 550*b* that are configured to extend into the cavity 124 of the receptacle housing 122 in an engaged position and to move outward from the cavity 124 to a disengaged position. The The first side latch 550*a* is configured to extend into the cavity 124 through a first latch opening 552*a* in the first side wall portion 331*a* of the receptacle housing 122 in the engaged position. The second side latch 550*b* is configured to extend through a second latch opening 552*b* in the second side wall portion 331*b* of the receptacle housing 122 in the engaged position. The first latch opening 552*a* and the second latch opening 552*b* may each extend through part of the convex wall portion 330*a* and part of the concave wall portion 330*b* adjacent to the first side wall portion 331*a* and the second side wall portion 331*b*. The first side latch 550*a* and the second side latch 550*b* may each include a lateral portion 551*a* that is located above (or below) the receptacle housing 122 and extends from a respective one of the first latch opening 552*a* or the second latch opening 552*b* toward the center line 321 of the receptacle housing 122, and an engagement portion 551*b* that extends in the height direction of the receptacle housing 122 relative to the lateral portion 551*a* (e.g., extends downward from the lateral portion 551*a*), and into the respective one of the first latch opening 552*a* or the second latch opening 552*b* for engagement with the first retainer notch 116*a* and the second retainer notch 116*b* of the plug connector 110 in the engaged position of the retainer 128. The first side latch 550*a* and the second side latch 550*b* are each movable in the width direction of the receptacle housing 122, toward and away from the center line 321.

The retainer 128 includes a spring 554 that urges the first side latch 550*a* and the second side latch 550*b* toward the engaged position (e.g., by urging them inward toward the center line 321). Under the biasing force of the spring 554, the first side latch 550*a* and the second side latch 550*b* are urged toward engagement with the plug connector 110 (e.g., with a corresponding plug connector) to retain the plug connector 110 in the cavity 124 of the receptacle housing 122. During insertion of the plug connector 110 into the cavity 124 of the receptacle connector 120, engagement of the connector body 112 of the plug connector 110 with the first side latch 550*a* and the second side latch 550*b* causes the first side latch 550*a* and the second side latch 550*b* to move outward, thereby permitting the plug connector 110 to enter the cavity 124, until the first retainer notch 116*a* and the second retainer notch 116*b* are aligned with the engagement portions 551*b* of the first side latch 550*a* and the second side latch 550*b*, at which point the force applied by the spring 554 moves the first side latch 550*a* and second side latch 550*b* to place the retainer 128 in the engaged position. In the illustrated implementation, the spring 554 is a tension spring that extends from the first side latch 550*a* to the second side latch 550*b* and is connected to the first side latch 550*a* and the second side latch 550*b* by conventional structures such as engagement of pert of the spring 554 with an aperture or hook formed on each of the first side latch 550*a* to the second side latch 550*b*. Alternatively, separate springs may be provided for each of the first side latch 550*a* to the second side latch 550*b*, such as compression springs or leaf springs that are each located outward relative to a respective one of the first side latch 550*a* to the second side latch 550*b* and urge them inward toward the center line 321.

The retainer 128 includes a release 556 that is operable to cause movement of the first side latch 550*a* and the second side latch 550*b* of the retainer 128 between the engaged position and the disengaged position. In the illustrated implementation, the release 556 includes a push block 558 that is in engagement with the first side latch 550*a* and the second side latch 550*b*. Movement of the push block 558 with respect to the first side latch 550*a* and the second side latch 550*b* causes movement of the first side latch 550*a* and the second side latch 550*b* between the engaged position and the disengaged position.

To move the first side latch 550*a* and the second side latch 550*b* outward in response to movement of the push block 558 in the depth direction of the receptacle housing 122, the configuration of the push block 558 define a cam/cam-follower arrangement with respect to the first side latch 550*a* and the second side latch 550*b*. In the illustrated implementation, the push block 558 has a first contact surface 560*a* that is in engagement with the first side latch 550*a* and a second contact surface 560*b* that is in engagement with the second side latch 550*b*. The first contact surface 560*a* and the second contact surface 560*b* are be angled relative to a movement axis of the push block 558 (e.g., the depth direction of the receptacle housing 122). The design of the push block 558 may be configured to fine tune the insertion and release forces, by selection of the angles of the first contact surface 560*a* and the second contact surface 560*b* relative to the movement axis of the block 558.

Figure 6:
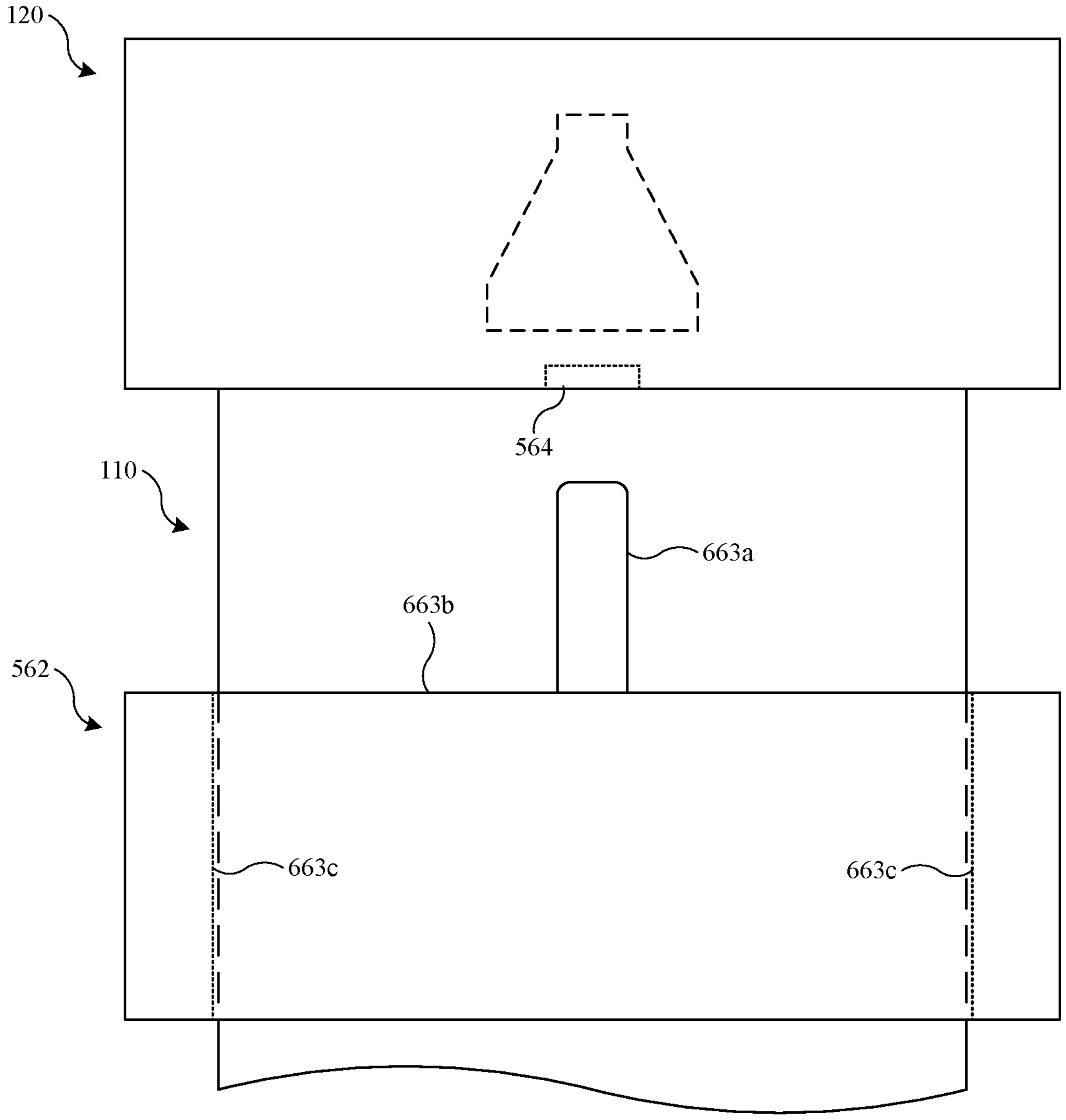
FIG. 6 is a top view of a release tool.

To disengage the retainer 128 by operating the release 556, the push block 558 may be moved using a release tool 562 that is inserted into an aperture 564 formed in the receptacle housing 122 to allow engagement of the release tool 562 with the push block 558. As seen in FIG. 6, the release tool 562 includes a pin 663*a* that is configured to be inserted into the aperture 564, and a body 663*b* that is configured to be placed in engagement with the plug connector 110 and slid along the plug connector 110. The release tool 562 is configured such that engaging the body 663*b* of the release tool 562 in with the plug connector 110 aligns the pin 663*a* of the release tool 562 with the aperture 564 to facilitate insertion of the pin 663*a* into the aperture 564. In particular, the body 663*b* of the release tool 562 is contoured complementarily to the geometric configuration of the plug connector 110 and may include side portions 663*c* that engage the first side wall portion 219*a* and the second side wall portion 219*b* of the connector body 112 of the plug connector 110 to enforce a correct lateral alignment of the release tool 562 with respect to the plug connector 110. As an alternative to use of the release tool 562, another type of tool may be used that can enter the aperture 564 to move the push block 558, or the release 556 may instead include a button, slider, knob, or other manually operated mechanism to cause movement of the push block 558.

Figure 7A:
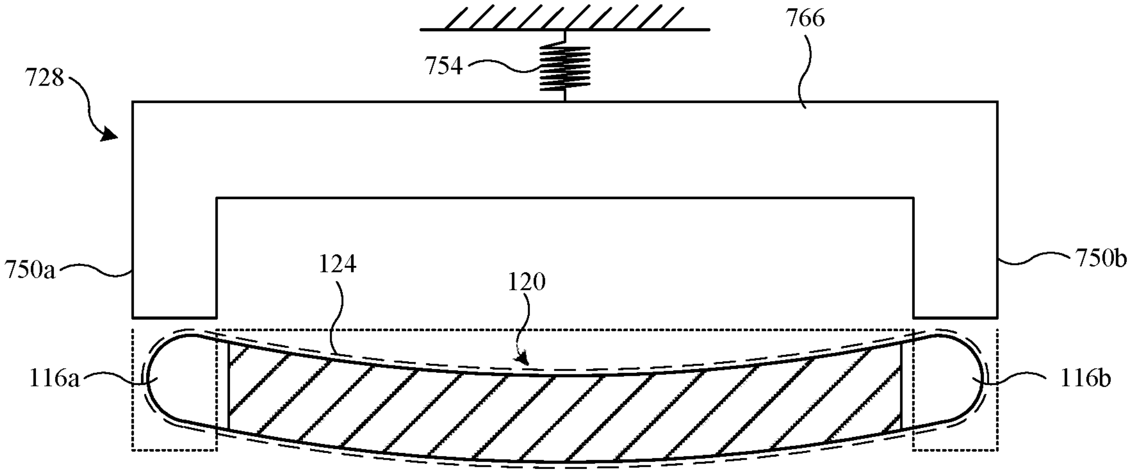
FIGS. 7A-7C are schematic illustrations of retainers according to alternative implementations.
Figure 7B:
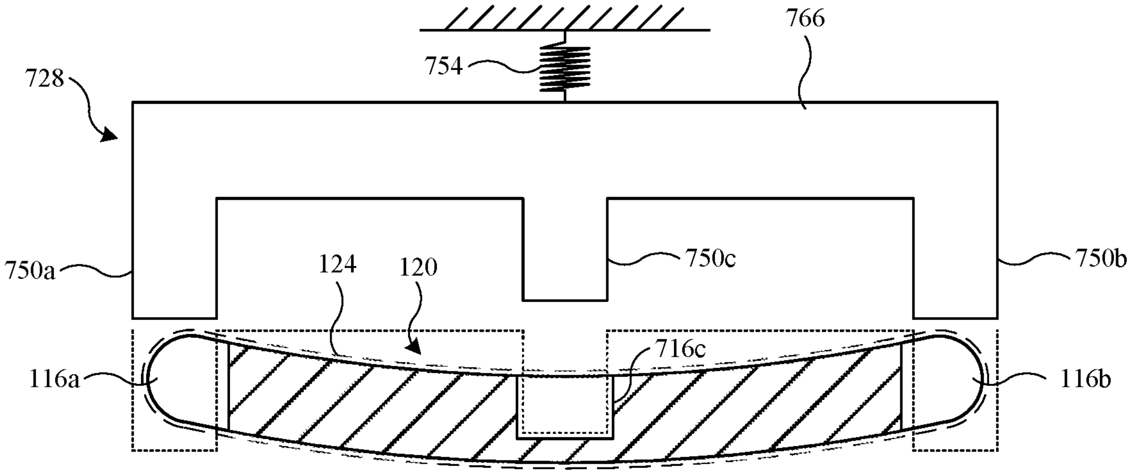
Figure 7C:
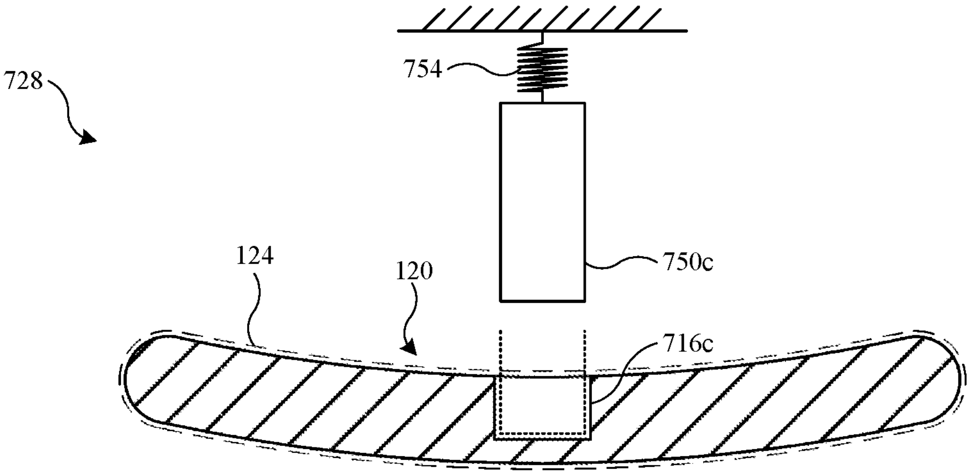

FIG. 7A shows a retainer 728 according to an alternative implementation that moves between a disengages position (shown in solid lines) to an engaged position (shown in dotted lines) with respect to the plug connector 110 by movement in the height direction of the receptacle housing 122 in response to a spring force applied by a spring 754 that urges the retainer 728 toward the engaged position. The spring 754 may be, as examples, a compression spring acting in the height direction, a torsion spring, a torsional bar, or a sheet metal spring finger. The retainer 728 includes a body 766 that extends in the width direction between a first side latch 750*a* and a second side latch 750*b* that are configured to be received in the first retainer notch 116*a* and the second retainer notch 116*b* of the plug connector 110 to retain the plug connector 110 in the receptacle connector 120. In another implementation, shown in FIG. 7B, the retainer 728 further includes a center latch 750*c* that is received in a recess 716*c* formed in one of the convex wall portion 218*a* or the concave wall portion 218*b* of the connector body 112 of the plug connector 110. In another implementation, shown in FIG. 7C, the first side latch 750*a* and the second side latch 750*b* are omitted and only the center latch 750*c* is included.

Figure 8:
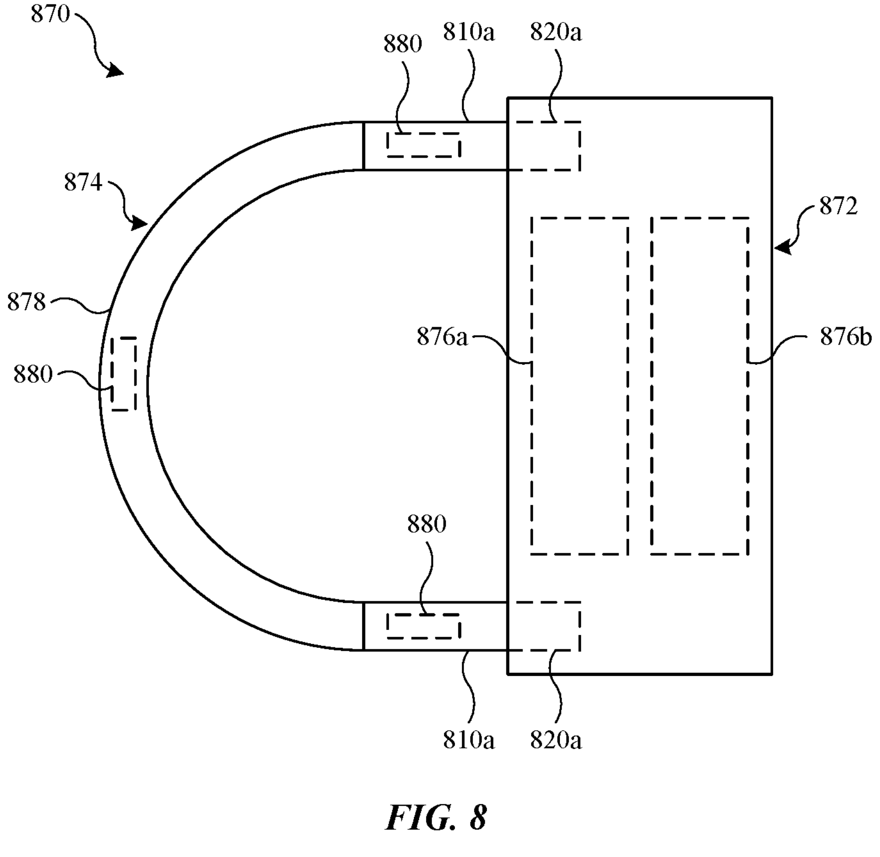
FIG. 8 is an illustration of a system that includes a display unit and a headband.

FIG. 8 is an illustration of a system 870 that includes a display unit 872 and a headband 874. The system 870 may function as a head-mounted display that is configured to be worn on the head of a user and presents content to the user on near-eye display screens.

The display unit 872 may be configured to track motion of the user's head and/or other portions of the user's body in order to output content according to tracked motion as part of a computer-generated reality experience. As an example, the display unit 872 may include control electronics 876*a* and an optical system 876*b*. The control electronics 876*a* may include a computing device (e.g., processor, memory, storage, etc.), sensors, communications devices, a battery, and/or other components. The optical system 876*b* may be an enclosed display system that present content on a non-see through display screen, or may be a translucent display that allows viewing of a surrounding environment. The optical system 876*b* may include a display device and components that direct emitted light from the display device to the user's eyes in order to display content to the user, such as lenses, reflectors, polarizers, filters, optical combiners, and/or other optical components.

The display unit 872 is configured to be connected to the headband 874. To connect the display unit 872 to the headband 874, the display unit includes a first receptacle connector 820*a* positioned on a first lateral side of the display unit 872 and a second receptacle connector 820*b* positioned on a second lateral side of the display unit 872. The first receptacle connector 820*a* and the second receptacle connector 820*b* are implemented in the manner described with respect to the receptacle connector 120.

The headband 874 is configured to support the display unit 872 with respect to the user's head. The headband 874 includes a first plug connector 810*a*, a second plug connector 810*b*, and an intermediate portion 878 that is connected to and extends between the first plug connector 810*a* and the second plug connector 810*b*. The first plug connector 810*a* and the second plug connector 810*b* are implemented in the manner described with respect to the plug connector 110. The intermediate portion 878 is configured to extend around the head of the user to secure the headband 874 thereto, and may be rigid or flexible. The intermediate portion 878 may be integrally formed, rigidly connected, flexibly connected, pivotally connected, or otherwise connected to the first plug connector 810*a* and the second plug connector 810*b*.

The first plug connector 810*a*, the second plug connector 810*b*, the intermediate portion 878, and/or another part of the headband 874 may incorporate an electronic component 880 that is electrically connected to the first plug connector 810*a* and/or the second plug connector 810*b* to establish an electrical connection with the control electronics 876*a* via the first receptacle connector 820*a* and/or the second receptacle connector 820*b*.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of a device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores information that adjustment of operation of a device according to user preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, needed information may be determined each time the device is used, and without subsequently storing the information or associating with the particular user.

What is claimed is:

1. A receptacle connector, comprising:
- a receptacle housing having a convex wall portion, a concave wall portion, a first side wall portion that extends between the convex wall portion and the concave wall portion, and a second side wall portion that extends between the convex wall portion and the concave wall portion, wherein the convex wall portion, the concave wall portion, the first side wall portion, and the second side wall portion at least partially define a cavity having an open end;
- first pin contacts located in the cavity of the receptacle housing on the convex wall portion;
- second pin contacts located in the cavity of the receptacle housing on the concave wall portion; and
- a retainer having a first side latch and a second side latch configured to extend into the cavity in an engaged position and to move outward from the cavity to a disengaged position.

2. The receptacle connector of claim 1, wherein the first side latch is configured to extend into the cavity through a first latch opening in the first side wall portion of the receptacle housing in the engaged position and the second side latch is configured to extend through a second latch opening in the second side wall portion of the receptacle housing in the engaged position.

3. The receptacle connector of claim 1, wherein the retainer includes a spring that urges the first side latch and the second side latch toward the engaged position.

4. The receptacle connector of claim 1, wherein the first side latch and the second side latch are configured for engagement with a corresponding plug connector to retain the corresponding plug connector in the cavity of the receptacle housing.

5. The receptacle connector of claim 1, wherein the retainer includes a release that is operable to cause movement of the first side latch and the second side latch of the retainer between the engaged position and the disengaged position.

6. The receptacle connector of claim 1, wherein:
- the retainer has a push block that is in engagement with the first side latch and the second side latch, and movement of the push block with respect to the first side latch and the second side latch causes movement of the first side latch and the second side latch between the engaged position and the disengaged position, and
- the push block has a first contact surface that is in engagement with the first side latch and a second contact surface that is in engagement with the second side latch, and the first contact surface and the second contact surface are angled relative to a movement axis of the push block.

7. A receptacle connector, comprising:
- a receptacle housing having a first curved wall portion, a second curved wall portion, a first side wall portion, and a second side wall portion that at least partially define a cavity having an open end, the first curved wall portion and the second curved wall portion spaced in a height direction of the receptacle housing, and the first side wall portion and the second side wall portion spaced in a width direction of the receptacle housing; and
- pin contacts located along the first curved wall portion of the receptacle housing and spaced from each other in the width direction of the receptacle housing,
- wherein the pin contacts include a first group of two or more contacts at a first angular orientation relative to the receptacle housing, a second group of two or more contacts at a second angular orientation relative to the receptacle housing, and a third group of two or more contacts at a third angular orientation relative to the receptacle housing, wherein the first angular orientation, the second angular orientation, and the third angular orientation are different from each other.

8. The receptacle connector of claim 7, wherein the pin contacts are each oriented according to a curvature of the first curved wall portion.

9. The receptacle connector of claim 7, wherein each of the pin contacts is configured to deflect along a respective line of action that is normal to a curvature of the first curved wall portion at each of the pin contacts.

10. The receptacle connector of claim 7, wherein:
- the first group of two or more contacts is located between the second group of two or more contacts and the third group of two or more contacts, the second group of two or more contacts is oriented outward relative to the first group of two or more contacts, and the third group of two or more contacts is oriented outward relative to the first group of two or more contacts.

11. The receptacle connector of claim 7, wherein the first curved wall portion has a convex curvature relative to the cavity and the second curved wall portion has a concave curvature relative to the cavity.

12. The receptacle connector of claim 7, wherein the first curved wall portion has a concave curvature relative to the cavity and the second curved wall portion has a convex curvature relative to the cavity.

13. The receptacle connector of claim 7, wherein the pin contacts are first pin contacts, the receptacle connector further comprising:
- second pin contacts located along the second curved wall portion of the receptacle housing and spaced from each other in the width direction of the receptacle housing.

14. The receptacle connector of claim 7, wherein the receptacle housing has an end wall portion that at least partially defines the cavity and is spaced from the open end of the cavity in a depth direction of the receptacle housing.

15. A receptacle connector, comprising:
- a receptacle housing having a convex wall portion and a concave wall portion that at least partially define a cavity having an open end;
- first pin contacts spaced along the convex wall portion of the receptacle housing and each configured to deflect along a respective line of action that is normal to a convex curvature of the convex wall portion at each of the first pin contacts; and second pin contacts spaced along the concave wall portion of the receptacle housing and each configured to deflect along a respective line of action that is normal to a concave curvature of the concave wall portion at each of the second pin contacts.

16. The receptacle connector of claim 15, wherein the first pin contacts are spaced from each other in a width direction of the receptacle housing and the second pin contacts are spaced from each other in the width direction of the receptacle housing.

17. The receptacle connector of claim 15, further comprising:

a retainer having a first side latch and a second side latch configured to extend into the cavity in an engaged position and to move outward from the cavity to a disengaged position, wherein the first side latch and the second side latch are configured for engagement with a corresponding plug connector to retain the corresponding plug connector in the cavity of the receptacle housing, wherein the retainer has a push block that has a first contact surface that is in engagement with the first side latch and a second contact surface that is in engagement with the second side latch, the first contact surface and the second contact surface are angled relative to a movement axis of the push block, and movement of the push block with respect to the first side latch and the second side latch causes movement of the first side latch and the second side latch between the engaged position and the disengaged position.

18. A plug connector, comprising:

a connector body having a convex wall portion and a concave wall portion;

first contact pads spaced along the convex wall portion of the connector body; and second contact pads spaced along the concave wall portion of the connector body.

19. The plug connector of claim 18, wherein the first contact pads are spaced from each other in a width direction of the connector body and the second contact pads are spaced from each other in the width direction of the connector body.

20. The plug connector of claim 18, wherein the connector body defines a first side wall portion that extends from the convex wall portion to the concave wall portion and a second side wall portion that extends from the convex wall portion to the concave wall portion.

21. The plug connector of claim 20, wherein the first side wall portion of the connector body defines a first retainer notch that extends from the convex wall portion to the concave wall portion, and the second side wall portion of the connector body defines a second retainer notch that extends from the convex wall portion to the concave wall portion.

22. A headband, comprising:

a first plug connector having a first convex wall portion, a first concave wall portion, and first connector pads that are located on at least one of the first convex wall portion or the first concave wall portion;

a second plug connector having a second convex wall portion, a second concave wall portion, and second connector pads that are located on at least one of the second convex wall portion or the second concave wall portion; and an intermediate portion that extends between the first plug connector and the second plug connector.

23. The headband of claim 22, wherein the intermediate portion is rigid.

24. The headband of claim 23, wherein the intermediate portion is flexible.

* * * * *